H. M. NICHOLS.
FILTER APPARATUS.
APPLICATION FILED FEB. 25, 1918.

1,302,832.

Patented May 6, 1919.
5 SHEETS—SHEET 1.

Inventor
Howard M. Nichols
By Cornelius D. Ehret
his Attorney

UNITED STATES PATENT OFFICE.

HOWARD M. NICHOLS, OF SWARTHMORE, PENNSYLVANIA, ASSIGNOR TO THE ATLANTIC REFINING COMPANY, OF PHILADELPHIA, PENNSYLVANIA, A CORPORATION OF PENNSYLVANIA.

FILTER APPARATUS.

1,302,832. Specification of Letters Patent. Patented May 6, 1919.

Application filed February 25, 1918. Serial No. 218,994.

*To all whom it may concern:*

Be it known that I, HOWARD M. NICHOLS, a citizen of the United States, residing at Swarthmore, county of Delaware, State of Pennsylvania, have invented a new and useful Filter Apparatus, of which the following is a specification.

My invention relates to apparatus for filtering material from a liquid, and particularly for extracting wax, tallow or other readily fusible solids from a liquid as oil, and more particularly for the extraction of paraffin wax from paraffin distillate.

In accordance with my invention, the liquid containing the material to be extracted therefrom is forced under suitable pressure into a chamber having a wall consisting of a suitable filtering medium, as fabric, of small heat capacity and low heat conductivity, disposed in a surrounding atmosphere which has free and direct access to and contact with the filtering medium throughout substantially its entire surface or area, the material to be extracted collecting upon one side of the filtering medium and the liquid filtrate passing through the filtering medium to the opposite side thereof into the surrounding atmosphere.

In the case of wax, tallow or like materials the liquid, as oil, containing the same may be suitably chilled to cause the more ready separation on the filtering medium; and in such case the atmosphere surrounding the filtering medium is maintained at any suitable low temperature equal to, lower or higher than the temperature of the chilled liquid operated upon.

When the extracted material is of a character which readily melts or fuses, as in the case of wax, tallow or the like, it is preferably removed by melting it while on the filtering medium and drawing it off in liquid form, and thereafter solidified by cooling.

When the extracted material is wax, tallow or the like containing oil or similar liquid, it may be brought to a temperature suitable for sweating out the oil or contained liquid while on the filtering medium, and thereafter melted and drawn off therefrom in liquid form. Preferably, however, the material of such character is immediately melted and drawn off from the filtering medium and the sweating operation conducted at a later stage.

In accordance with my invention, the filter structure consists of a chamber formed substantially entirely by a fabric or equivalent filtering medium which has small heat capacity and low heat conductivity and which is supported relatively free and independently of plates or parts of metal or other material of relatively high heat conductivity and capacity and is surrounded by a free atmosphere without closely approaching parts of metal or other material of high heat conductivity and high heat capacity. By employment of such structure, the wax or other material is readily extracted from the oil or other liquid, and there is effected an economy in the energy employed for maintaining the filtering apparatus at the necessary low temperature because of the small amount of heat which can flow into the apparatus because of its small heat capacity. The heat content of the apparatus after the rise in temperature necessary for melting the wax or other material for its removal from the filter chamber is small, and there is correspondingly small loss upon reintroduction of chilled liquid which must again reduce the temperature of the filtering apparatus.

My invention resides, therefore, in filtering apparatus or filter press structure whose heat capacity is a minimum; into whose structure parts of metal or other material of high heat conductivity do not enter to any substantial extent; which can readily be surrounded by very cold atmosphere, because the structure is such that the wax need not be removed mechanically, as by hand; and which is free of the numerous joints between the elements or parts of the more common forms of filter presses in which the joints must be made leak-proof before introduction of liquid and which must be disassembled to remove the extracted material.

My apparatus comprises filter press structure comprising a fabric tube of circular or other suitable cross section, and preferably of great length as compared with its diameter or cross section, with connections for introducing the liquid to be filtered under suitable pressure, for introducing a heating medium, and for drawing off the melted wax or other material.

My invention resides in apparatus of the character referred to and in further features of construction hereinafter described and claimed.

For an illustration of some of the various forms of apparatus embodying my invention, reference is to be had to the accompanying drawings, in which.

Figures 1, 6:
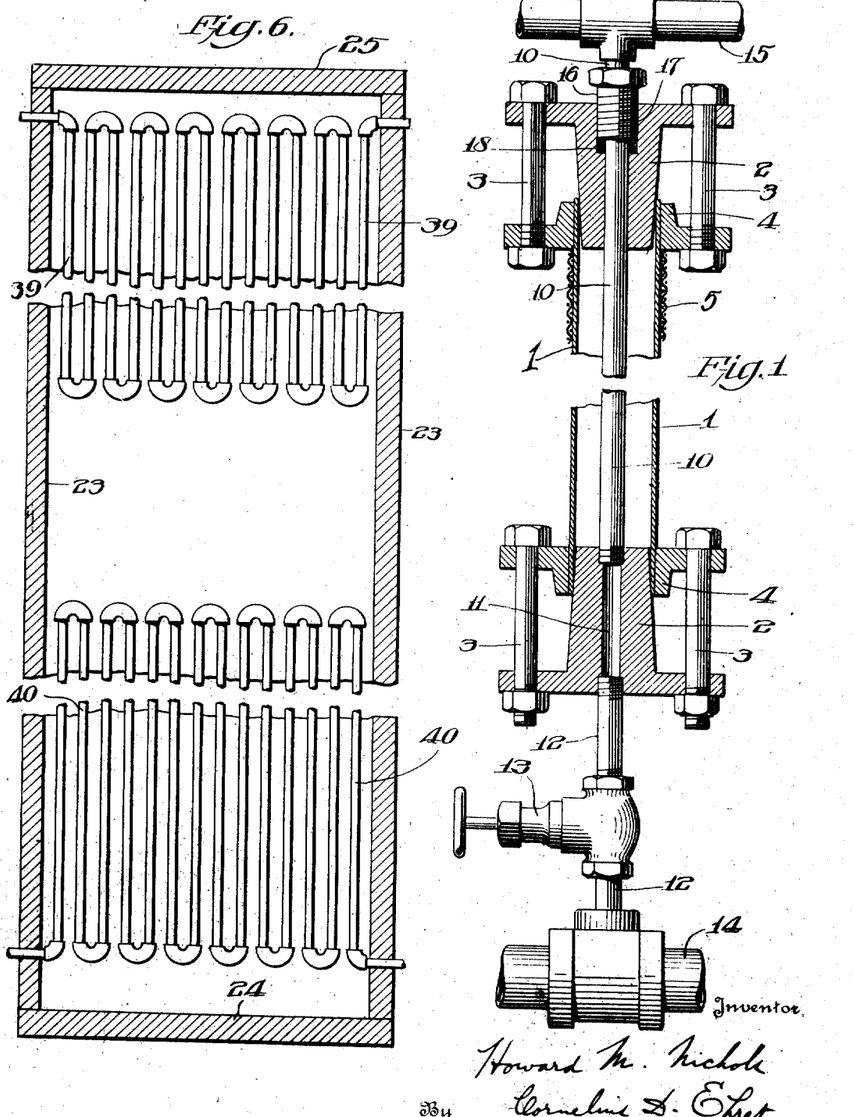
Figure 1 is a vertical sectional view, partly in elevation, showing a single unit of wax pressing apparatus embodying my invention.
Fig. 6 is a vertical sectional view, some parts in elevation, taken on the line 3—3 of Fig. 4.
Figures 2, 3:
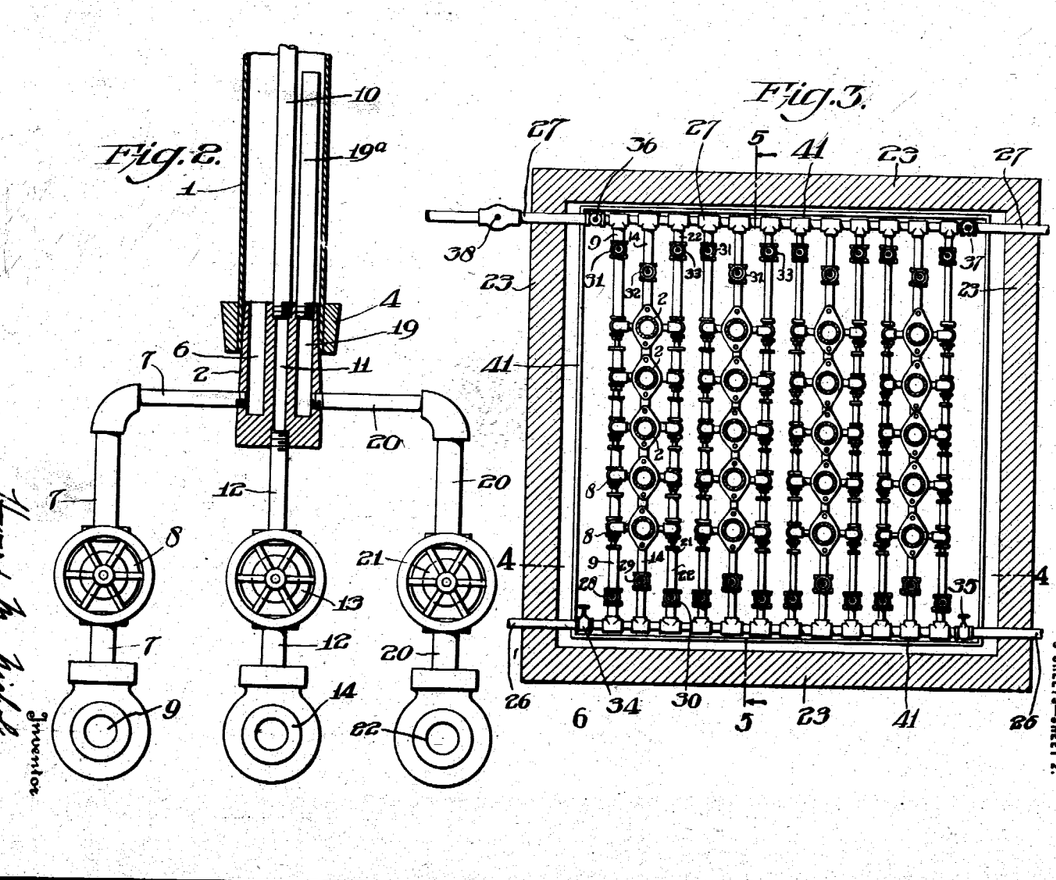
Fig. 2 is a vertical sectional view, partly in elevation, taken at right angles to Fig. 1.
Fig. 3 is a horizontal sectional view, partly in plan, through a housing or room in which is contained a plurality of my wax pressing units.

Referring to Figs. 1 and 2, 1 is a casing of suitable fabric, such as woven cotton or linen fabric, and such, for example, as employed for fabric fire hose or the like. The fabric casing 1 may be of any suitable shape or form, though tubular form is preferred, and for brevity the casing or chamber 1 is herein referred to as a tube.

The tube or hose 1 is preferably of circular cross section, though it will be understood that it may be of any other suitable cross section. It is preferably long as compared to its diameter, and as an example merely and without limiting my invention to any particular dimensions, the tube 1 may be 20 feet long, and have a diameter of 2 inches, more or less.

The tube 1 is preferably disposed in a vertical position with its upper and lower ends clamped to or otherwise suitably held in liquid tight relation with the tapered plugs or blocks 2, 2 longitudinally of which are forced the glands or clamping members 4 by taking up upon the bolts 3. The end of the tube 1 is confined between the members 2 and 3, and as the member 4 is drawn longitudinally of the member 2, the hose is securely clamped between them, forming a pressure-tight joint.

In case exceptionally high or unusual pressures are employed, there may be disposed around and outside of the hose 1 an armor 5 of metal, fabric or cord of any suitable structure having suitable openings for passage of liquid therethrough; for example, a woven wire armor such as commonly used on air hose may be employed.

The lower plug or block 2 has therein a passage 6 communicating with the interior of the tube 1 and connecting through pipe 7 and valve 8 with a header pipe or manifold 9 connecting with the source of wax bearing oil.

Extending longitudinally of and preferably at the center of the tube 1 is the pipe 10 which at its lower end is threaded into the lower plug or block 2 in communication with the passage 11 therein, which latter at its lower end communicates through the pipe 12 and the valve 13 with the manifold or header 14 communicating with a source of any suitable heating medium, as steam, which is passed upwardly through the valve 13, pipe 12, passage 11 and pipe 10 to the exhaust manifold or header 15. At its upper end the pipe 10 extends through the upper plug or block 2 and through the bland member 16 to header 15. Member 16 is screw threaded into the hole 17 in the member 2, and within the hole 17 and beneath the bland 16 is disposed the packing material 18 which, upon advance of the gland member 16 downwardly, makes a pressure-tight connection between the pipe 10 and the block 2. By this construction expansion or contraction of pipe 10 due to temperature changes may take place without effect upon hose 1 or upper plug 2.

In the lower plug or block 2 may be provided a third passage 19, Fig. 2, communicating with the interior of the tube 1, either directly or through a tube 19ª of any suitable length screw threaded into the plug 2 and communicating with the passage 19. The passage 19 communicates through pipe 20 and valve 21 with the manifold or header 22 through which steam or any other suitable heating medium is delivered for purposes hereinafter described.

Figure 4:
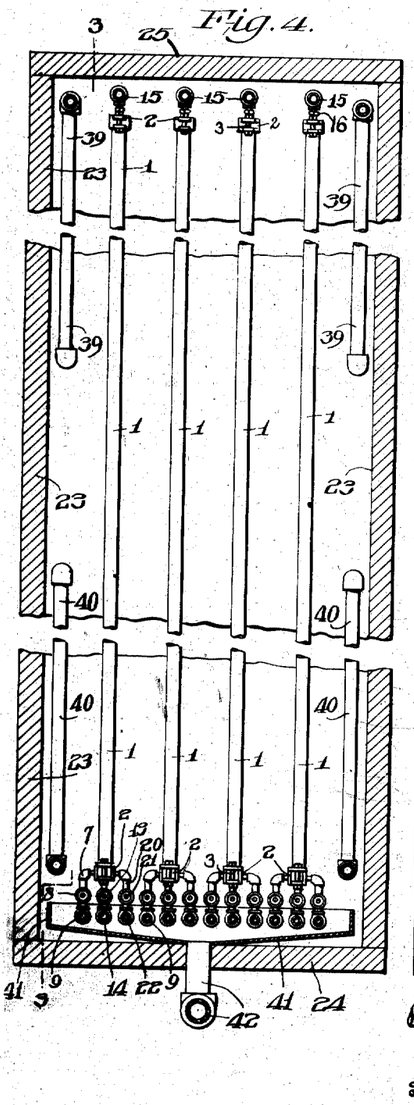
Fig. 4 is a vertical sectional view, some parts in elevation, taken on the line 4—4 of Fig. 3.
Figure 5:
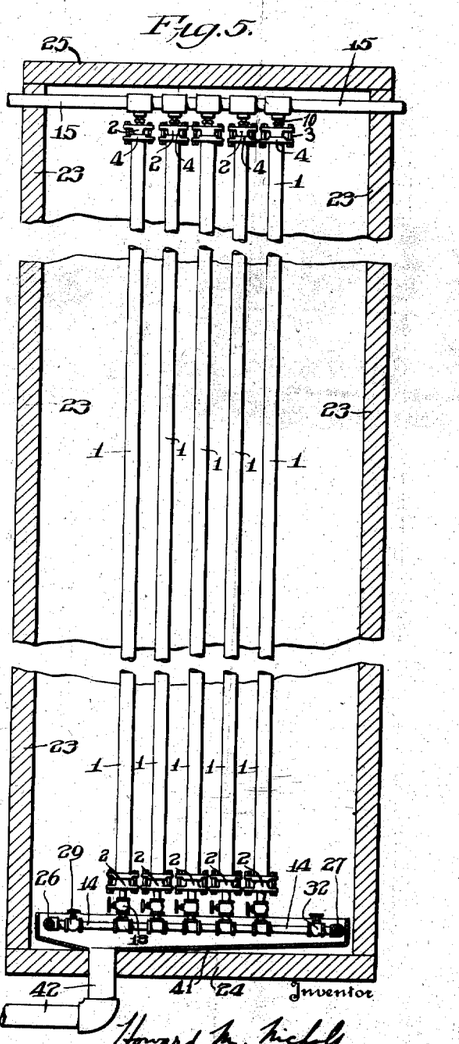
Fig. 5 is a vertical sectional view, some parts in elevation, taken on the line 5—5 of Fig. 3.
Figure 7:
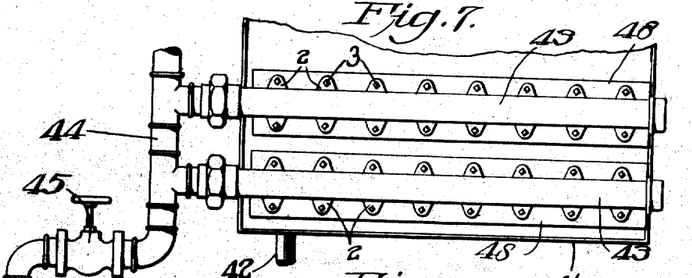
Fig. 7 is a top plan view of a modified form of apparatus embodying my invention.
Figure 8:
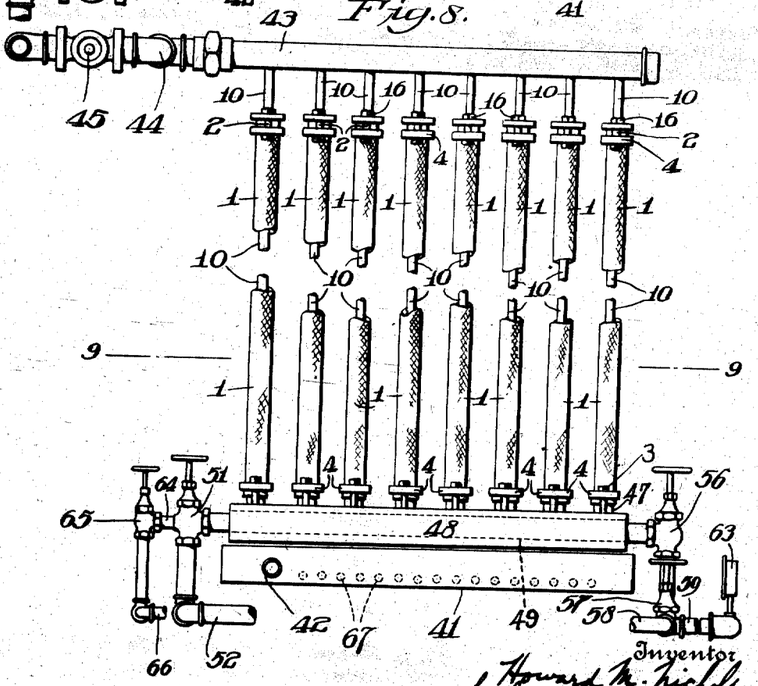
Fig. 8 is a side elevational view of apparatus shown in Fig. 7.
Figure 9:
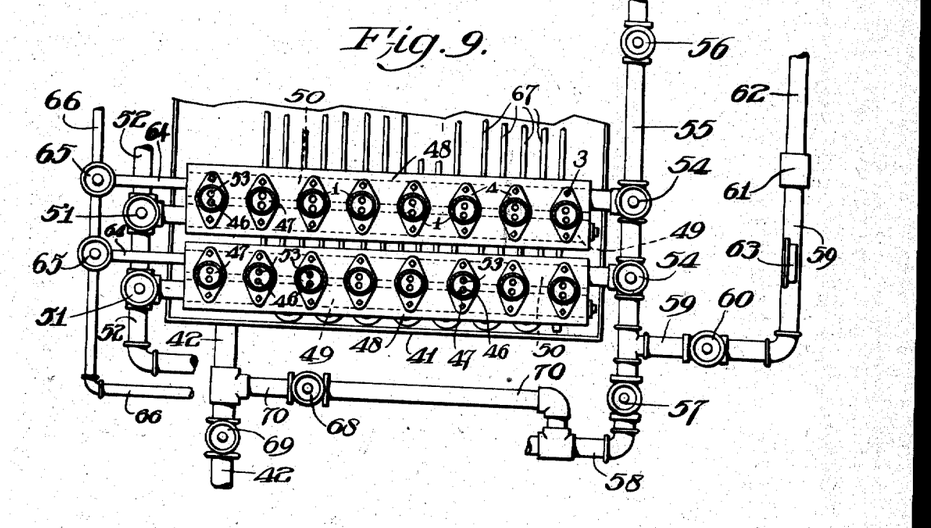
Fig. 9 is a horizontal sectional view and plan of the lower part of the apparatus of Fig. 8.
Figure 10:
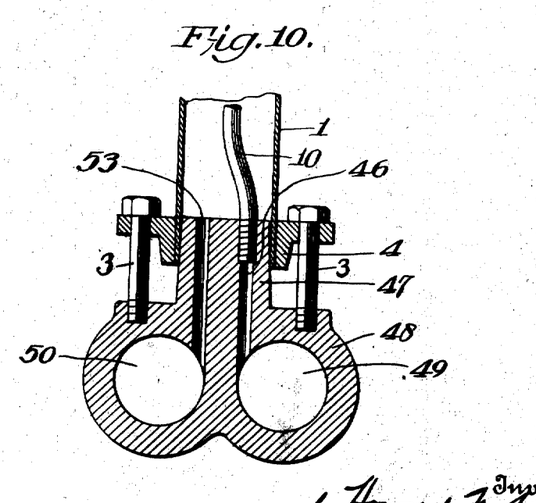
Fig. 10 is a cross sectional view, on enlarged scale, of one of the bottom manifolds of Figs. 8 and 9.

Any suitable number of hose or tubular units 1 of the character above described may be assembled in a bank as illustrated in Figs. 3, 4 and 5, within any suitable room or chamber whose side walls, bottom and roof are indicated respectively at 23, 24 and 25, all preferably of poor heat conductivity or suitably insulated against heat transfer therethrough.

Along one side near the bottom of the room is a pipe or header 26 and on the opposite side is a similarly disposed header or pipe 27. Extending between the pipes 26 and 27 are the four groups of transverse headers or pipes, each group comprising the three pipes 9, 14 and 22 hereinbefore referred to, each hose unit communicating with the headers 9, 14 and 22 through the pipes and valve as described in connection with Figs. 1 and 2. At the ends of the transverse headers 9, 14 and 22 are the valves 28, 29, 30, 31, 32 and 33. And on opposite ends of the header or pipe 26 within the room are the valves 34, 35; and the pipe 27 is similarly controlled by valves 36 and 37, the pipe 27 having in addition a safety valve or relief valve 38 indicated in Fig. 3.

At the top of the room are disposed the horizontal pipes or headers 15 with which the pipes 10 of the several tube units communicate.

As illustrated in Figs. 4 and 6, there is disposed on each of the opposite sides near the top of the chamber a refrigerating coil 39 through which is circulaed any suitable cooling medium, as for example, chilled brine.

And similarly disposed near the bottom of the chamber are the heating coils 40 through which may be circulated steam or any other suitable heating medium.

Disposed beneath the filter press units within the chamber is a pan 41 having a bottom suitably inclined toward and delivering into the draw-off pipe 42.

When necessary to repair a tube unit or to discontinue its operation for any cause, it may be isolated or taken out of service by closing its associated valves 8, 13 and 21.

Referring to Figs. 7 to 10 inclusive, a modified and simpler structure is shown.

At the top of the apparatus are the horizontal pipes or manifolds 43, each closed at its one end and at its other connected to the pipe 44, to which steam or other heating fluid is delivered through the valve 45. Connecting with each pipe 43 is a plurality of vertical pipes 10 extending, as in Fig. 1, through the gland members 16 carried by the upper plugs or blocks 2, to which the hose or tubes 1 are secured by the members 4, the pipes 10 extending to the bottom of the apparatus and into the holes 46 in the tapered plug or block members 47 cast integral with the manifold 48 having the longitudinally extending chambers 49 and 50, Fig. 10, the holes 46 communicating with the chamber 49 connected through valve 51 with the steam outlet pipe 52. The fabric tubes 1 are secured, as in Fig. 1, at their lower ends by members 4 to the blocks or plug members 47. With the chamber 50 in the manifold 48 communicates a hole 53 in each member 47, and the chambers 50 at one end communicate through the hand valves 54 with the pipe 55, controlled by hand valve 56 for delivering the wax bearing liquid into the chambers 50. The pipe 55 communicates through the valve 57 with the pipe 58, through which melted wax may be drawn off. Communicating with the pipe 55 is the pipe 59, controlled by the hand valve 60 and communicating with the relief valve 61, which communicates with the pipe 62. To the pipe 59 may be attached a pressure gage 63. With the other end of each of the chambers 50 is connected a pipe 64 communicating through hand valve 65 with the pipe 66 connected with a source of air under pressure. Beneath the manifolds 48 is disposed a pan 41 having the oil draw-off pipe 42 controlled by valve 69. From pipe 42 there is a branch pipe 70 connecting with pipe 58 and controlled by valve 68.

The mode of operation of the apparatus of Figs. 1 to 6 for extracting wax from paraffin distillate is as follows:

The valves 35 and 37 are closed and valve 36 opened. The valves 29, 30, 32 and 33 in the transverse headers 14 and 22 are closed. The valves 8, 13 and 21 of all the tube units remain open except when the unit is to be isolated or taken out of service. The valves 28 and 31 in the transverse headers 9 are opened. Thereupon the valve 34 is opened, with the result that there is delivered through the pipe 26 wax bearing oil, such as the petroleum product known as paraffin distillate, chilled to suitably low temperature, as for example, 32 degrees F. or any suitable higher or lower temperature. The wax bearing oil is pumped through the pipe 26 under any suitable pressure and is delivered into the transverse headers 9 and from them through the valves 8 and pipes 7 through the lower plugs or blocks 2 into the tubes or hose 1, completely filling them. The wax collects and is retained upon the inner walls of the fabric tubes 1 and the oil, more or less completely freed of wax, passes through the fabric walls, trickles down the outer surface thereof and collects in the pan 41 and is drawn off through the pipe 42 to any suitable point, as a storage tank.

Upon first introducing wax bearing oil into a tube 1 a low pressure on the oil suffices; but as wax collects within the tube, resistance to the flow of oil progressively increases, requiring increasing oil pressure, which may reach 125 pounds per square inch, or higher.

Should the pressure of the wax bearing oil delivered through the pipe 26 exceed a predetermined value to which the relief or safety valve 38 is set, the latter will open and allow passage of wax bearing oil through the transverse headers 9 into the header 27 through the valve 36 and relief valve 38, and thereby prevent excessive pressure within the tubes 1.

While the wax may be pressed or extracted from the wax bearing oil as above described without additional chilling of the room or chamber, it is preferred to cool the chamber by passing cold brine or other medium through the coils 39, the heating coils 40 in the meantime being inoperative. The room and therefore the atmosphere surrounding the tubes 1, is additionally chilled, and preferably to a temperature several degrees below the temperature of the wax bearing oil delivered into the tubes. By so maintaining the surrounding atmosphere at a lower temperature, the separation of the wax from the oil within the tubes 1 occurs with greater rapidity; and the separation is more complete, as manifested by the fact that the oil delivered into the pan 41 and through the pipes 42 shows a lower cold or cloud test than in the case where the temperature external to the tubes 1 is not so maintained lower than the temperature of the wax bearing oil entering the tubes.

The deliverery of wax bearing oil through the pipe 26 is continued until the tubes 1 are filled with wax, or until the deposit of wax upon the inside of the tubes has reached a desired thickness.

If it is desired to sweat out the oil contained in the wax while the latter is in the position in which deposited in the tubes 1, the valves 34 and 36 are closed, and the valve 35 opened, thereby admitting any suitable heating fluid through the right end of the pipe 26, Fig. 3. The valves 29 in the transverse headers 14 are opened, and heating fluid delivered therethrough and through the pipes 12 and passages 11 in the plugs or blocks 2 into the pipes 10 within the tubes 1, the heating fluid passing upwardly through these pipes and escaping into the header 15 and carried off thereby. The heating fluid flowing through the pipes 10 is regulated to impart to the wax a suitable temperature for causing the oil contained therein to sweat out therefrom. The oil in so separating from the wax passes outwardly through the wax and through the fabric walls of the tubes 1, trickles downwardly on the outside of the tubes, and collects in the pan 41 and is drawn off through the pipe 42.

This sweating process may be aided by shutting off the flow of chilled brine through the pipe coil 39 and passing steam or other heating medium through the lower pipe coils 40 to produce a suitable temperature within the room or chamber.

To remove the wax from the tubes 1 either in the case where the wax has first been sweated out as above described or in the case where it has not been so treated, heating fluid at sufficiently high temperature is passed in sufficient quantity through the pipes 10 as heretofore described to raise the wax to and above its melting point, whereupon it flows downwardly through the passages 6 in the lower plugs 2 through the pipes 7 and valves 8 to the transverse headers 9 and thence through the now open valves 31 into the header 27 and delivered through the now open valve 37 to any suitable point or to storage. Or for the purpose of melting the wax, the valves 30 in the transverse headers 22 are opened, whereby steam or other heating fluid flows through the valve 35 and header 26 through the valves 30 to the transverse headers 22 and thence through the pipes 20 and valves 21 through the passages 19 in the lower plugs or blocks 2 and through the short pipes 19ª directly into the interior of the tubes into direct contact with the wax, which melts and flows out through the passages 6 and pipes 7, valves 8 and transverse headers 9, through pipe 27 and valve 37, as above described. Or heating fluid may be simultaneously passed through the pipes 10 and admitted through the pipes 19ª for wax melting purposes.

When the tubes 1 have been cleared of wax, the operation may be repeated by again suitably setting the valves and admitting chilled wax bearing oil.

The operation of the apparatus of Figs. 7 to 10 inclusive is in general the same as that above described. Briefly it is as follows:

By opening the valve 56 and the valves 54, the valves 65 and 57 being closed, the chilled wax bearing oil is delivered under pressure into the chambers 50, from which it rises through holes 53 into the interior of the fabric tubes 1; wax separates by collecting upon the inner wall of tube 1 and the oil passes through the fabric of the tubes 1 and trickles down into the pan 41 as hereinbefore described. With the valve 60 open, the pressure of the wax bearing oil may be read upon the gage 63. If the pressure rises above a predetermined value, the relief valve 61 opens and some of the wax bearing oil will pass off through pipe 62, back to the reservoir or tank containing the wax bearing oil to be treated. By such arrangement the tubes 1 are protected against rupture.

After wax has accumulated to suitable depth or thickness on the inner walls of the tubes 1, the valve 56 may be closed and the valves 45 and 51 opened, whereupon steam or other heating fluid will pass downwardly through the pipes 10 from the manifolds 43 into the chambers 49 of the lower manifolds 48 and through the valves 51 and out by the pipe 52. Accordingly the wax within the tubes 1 is raised in temperature to sweat out oil therefrom, which passes outwardly through the fabric tube. Or preferably, the temperature is raised to a point causing the wax to melt, whereupon it will flow downwardly through the holes 53 into the chambers 50, out through the valves 54 and 57 to the pipe 58, which carries it to its destination, where it is solidified and may later be sweated out. Thereafter the operation may be rpeated by again introducing wax bearing oil through valves 56 and 54 as above described.

When the wax is melted in the tubes 1, some escapes through them and finally collects and solidifies in the pan 41. It may there be melted by passing steam through the pipe 67, and drawn off through pipe 42 and valve 68 to pipe 58, valve 69 being closed.

Whenever desirable, the chambers 50 may be cleared of wax bearing oil or of melted wax by opening the valves 65 and admitting air or other suitable medium under pressure to blow the oil or melted wax out through valves 54, the oil being delivered back, if desired, through valve 56, or drawn off through pipe 58; and melted wax may be blown off through the valves 54 and pipe 58.

By recourse to the structure of the character hereinbefore described, the heat capacity is very small because of the small heat capacity of the tubes 1 and because of the presence in only insignificant quantities of metal or other material of relatively great heat capacity.

As a result, the rise in temperature accompanying melting of the wax stores in the structure only a relatively very small amount of heat, and the apparatus is therefore the more quickly and inexpensively cooled upon reintroduction of chilled wax bearing oil.

And because of its low heat capacity and low heat conductivity the apparatus during the period of extraction of wax from chilled oil absorbs only inconsequential amounts of heat from the surroundings with resultant saving in refrigeration.

Furthermore, by structure of the character described, the filter chambers or tubes 1 are surrounded by free atmosphere which is readily maintained at suitably low temperature, it being unnecessary to disassemble the structure for removal of wax, as in the case of the commonly used plate type filter presses.

Furthermore, the structure is extremely simple and is of a character avoiding the numerous joints characteristic of the plate type filter in which it is necessary to disassemble the plates, gaskets, etc., to permit access to the collected wax, which is then removed mechanically, as by hand operated tools; and which must be reassembled with the exercise of care to make the joints leakproof before admission of fresh wax bearing oil.

By my structure the ratio of the amount of wax extracted to the amount of metal present or to the total heat capacity of the metal is large as compared to any other type of filter apparatus of which I am aware.

By structure of the character herein described, great saving in labor is effected because of the simplicity of mode of operation whereby the wax collected in the filter chambers is melted and withdrawn in liquid form, requiring no disassembling or disconnection of parts of the apparatus. And the operation of the apparatus is effected without recourse to mechanical force or effort, as compared with the force and effort necessary for removing wax from plate type filter presses, the wax being simply melted and drawn off as described.

Furthermore, by apparatus of the character described, its use may be practically continuous, the time for melting and drawing off the wax being relatively short and inconsequential as compared with the time consumed in disassembling plate type filter presses, removing the wax therefrom, and reassembling the same.

The structure of the character herein described is simpler, less costly, and requires less ground or floor space than any other type of filter press structure of equal capacity of which I am aware.

What I claim is:

1. Apparatus of low heat capacity for filtering wax from chilled oil comprising a closed filter chamber consisting of a filter medium of low heat capacity, means for supporting said medium with its inner and outer surfaces substantially free of contact with other bodies, means for introducing the chilled wax bearing oil into said chamber, means for melting the wax collected upon the inner surface of said chamber, and means for conducting the melted wax from said chamber, whereby wax may be filtered from the oil and removed from the chamber without disassembling the filter apparatus.

2. Apparatus of low heat capacity for filtering wax from chilled oil comprising filter fabric of low heat conductivity and low heat capacity forming a closed filter chamber, means for supporting said filter fabric with its inner surface substantially free of contact with other bodies and its outer surface in substantially free contact with the surrounding atmosphere, means for delivering chilled wax bearing oil under pressure into said chamber, a heater within said chamber spaced from the wall thereof for melting the wax collected upon the inner surface of said chamber, and means for conducting the melted wax from said chamber.

3. Apparatus of low heat capacity for filtering wax from chilled oil comprising filter fabric of low heat conductivity and low heat capacity forming a closed filter chamber, means for supporting said filter fabric with its inner surface substantially free of contact with other bodies and its outer surface in substantially free contact with the surrounding atmosphere, means for maintaining the atmosphere surrounding said chamber at low temperature, means for delivering chilled wax bearing oil under pressure into said chamber, means for melting the wax collected upon the inner surface of said chamber, and means for conducting the melted wax from said chamber.

4. Apparatus of low heat capacity for filtering wax from chilled oil comprising a closed filter chamber consisting of a filter medium of low heat capacity, means for supporting said medium with its inner and outer surfaces substantially free of contact with other bodies, means for introducing the chilled wax bearing oil into said chamber, means within said chamber for liberating heat, and means for drawing off melted wax from said chamber.

5. Apparatus of low heat capacity for filtering wax from chilled oil comprising a closed filter chamber consisting of a filter medium of low heat capacity, means for supporting said medium with its inner and outer surfaces substantially free of contact with other bodies, means for introducing the chilled wax bearing oil into said chamber, means within said chamber for receiving a heating medium and isolating the heating medium from the contents of said chamber, and means for drawing off melted wax from said chamber.

6. Apparatus of low heat capacity for filtering wax from chilled oil comprising a substantially vertical fabric tube having its inner and outer surfaces substantially free from contact with other bodies, means for delivering the chilled wax bearing oil into said tube under pressure, means within said tube for liberating heat, and means for conducting melted wax from said tube.

7. Filter apparatus comprising a fabric tube, end closures for said tube, an end closure comprising a plug extending into said tube, a clamping member surrounding said tube, said plug and clamping member being relatively tapered, means for forcing said clamping member longitudinally of said plug for clamping said tube to said plug, and means for introducing into said tube fluid to be filtered.

8. Filter apparatus comprising a fabric tube, end closures for said tube, an end closure comprising a plug, said plug having a passage opening into said tube, means for introducing fluid to be filtered through said passage into said tube, a pipe within said tube extending between said end closures, and connections for passing heating medium through said pipe.

9. Filter apparatus comprising a fabric tube, means for introducing fluid to be filtered into said tube, a pipe extending longitudinally through said tube and spaced therefrom, and a fluid connection communicating with said pipe.

10. Filter apparatus comprising a fabric tube, end closures for said tube, means for introducing fluid to be filtered into said tube, and a pipe within said tube extending at its one end through one end closure, the other end closure having a passage communicating with the other end of said pipe.

11. Apparatus of low heat capacity for filtering wax from chilled oil comprising a plurality of groups of closed fabric tubes having their inner and outer surfaces substantially free of contact with other bodies, means for conducting the wax bearing oil into the tubes of each group, means within each tube for melting the wax gathered upon the inner surface thereof, means for drawing off melted wax from each tube, and means for isolating each group of tubes from the others.

12. Filter apparatus comprising a fabric tube, end closures for said tube, means for introducing fluid to be filtered into said tube, a pipe within said tube and having fluid connections at opposite ends thereof through said end closures, one of said end closures having a passage communicating with the interior of said tube, and a connection with said passage from the exterior of said tube.

13. Filter apparatus comprising a fabric tube, end closures for said tube, a connection for introducing liquid to be filtered into said tube, a second connection with the interior of said tube for delivering heating medium into the same, and a pipe within said tube and communicating with the exterior at opposite ends thereof.

14. Filter apparatus comprising a plurality of closed fabric tubes, a manifold having passages therein, connections from one of said passages to the interiors of said tubes, means for conducting liquid to be filtered into said one of said passages, pipes in said tubes communicating with another of said passages, and a heating fluid connection with said other of said passages.

15. Filter apparatus comprising a plurality of closed fabric tubes, a manifold having passages therein, connections from one of said passages to the interiors of said tubes, means for conducting liquid to be filtered into said one of said passages, pipes in said tubes communicating at one end with another of said passages, a second manifold connected with said pipes at their other ends, and heating fluid connections with said other of said passages and said second manifold.

16. Filter apparatus comprising a plurality of closed fabric tubes, a manifold having passages therein, connections from one of said passages to the interiors of said tubes, pipes within said tubes connecting with another of said passages, means for delivering heating fluid to said pipes for melting material gathered upon the inner surfaces of said tubes which flows through said connections into said one of said passages, and connections with said one of said passages for delivering liquid to be filtered thereto and for drawing therefrom said melted material.

17. Filter apparatus comprising a plurality of fabric tubes, end closures therefor, a manifold having passages therein, connections from one of said passages to the interiors of said tubes, pipes in said tubes communicating at one end with another of said passages, and a second manifold connected with said pipes at their other ends.

18. Filter apparatus comprising a plurality of vertical fabric tubes, a manifold having passages therein, an end closure for each tube on said manifold having apertures communicating with said passages, closures at the upper ends of said tubes, a pipe within each tube communicating with one of said passages through one of said apertures, another of said apertures communicating with the interior of said tube and with another of said passages, and a manifold above said tubes connecting with said pipes.

19. Filter apparatus comprising a fabric tube, a manifold having a plurality of passages therein, a connection from one of said passages to the interior of said tube, means for conducting liquid to be filtered into said passage, means for conducting elastic fluid into said passage, a pipe within said tube connecting with another of said passages in said manifold, and means for conducting fluid into said pipe.

20. Filter apparatus comprising a plurality of vertical filter tubes, a manifold for conducting liquid to be filtered into said tubes, a receptacle beneath said tubes for receiving liquid passed through the same, means for heating the interiors of said tubes, and heating means in said receptacle.

21. Filter apparatus comprising a plurality of filter tubes, a manifold having passages therein, connections from one of said passages to the interiors of said tubes, pipes in said tubes communicating with another of said passages, means for delivering liquid into said one of said passages, means for drawing off liquid from said one of said passages, and valves controlling the introduction and withdrawal of liquid from said one of said passages.

22. Apparatus of low heat capacity for filtering wax from oil comprising a substantially vertical fabric tube, means supporting said tube with its inner and outer surfaces substantially free of contact with other bodies, means for delivering wax bearing oil under pressure into said tube, means for maintaining the atmosphere surrounding said tube at low temperature, a receptacle for collecting the oil passing through the wall of said tube, means for discontinuing the flow of wax bearing oil, means within said tube for melting the wax gathered on its inner surface, and means for drawing off the melted wax from said tube.

23. Filter apparatus comprising a substantially vertical fabric tube having its inner and outer surfaces substantially free of contact with other bodies, means for introducing into said tube the fluid to be filtered, and a pipe extending through said tube and spaced from the wall thereof.

24. Filter apparatus comprising a self-supporting fabric tube having its inner and outer wall surfaces substantially free, means for introducing fluid to be filtered under pressure into said tube, a pipe extending through said tube and spaced from the inner wall thereof, and means for delivering heating medium through said pipe.

25. Filter apparatus comprising a self-supporting fabric tube whose inner and outer surfaces are substantially free, a member having a plurality of passages, one of said passages communicating with the interior of said tube, and a pipe within said tube spaced from the inner walls thereof and connected with another of said passages.

26. Filter apparatus comprising a fabric tube whose inner and outer surfaces are substantially free, a member having a plurality of passages, a plug on said member extending into said tube, means surrounding said tube and clamping the same to said plug, one of said passages communicating with the interior of said tube through said plug for delivering thereto liquid to be filtered, a pipe extending through said tube and spaced from the inner wall thereof connected through said plug with another of said passages, and means for delivering heating fluid to said pipe.

27. Filter apparatus comprising a plurality of fabric chambers, a manifold having passages therein, plugs on said manifold forming closures for said chambers, means for conducting liquid into and away from said chambers through said plugs and one of said passages, heating elements within said chambers, and connections therewith extending through said plugs and communicating with another of said passages in said manifold.

28. Filter apparatus comprising a substantially vertical fabric tube having its inner and outer surfaces substantially free of contact with other bodies, tapering plugs projecting into said tube at its upper and lower ends, means for clamping the ends of said tube to said plugs to form a pressure-tight joint, a heating element within said tube, connections to and from the same through said plugs, and a fluid connection with the interior of said tube through one of said plugs for introducing and withdrawing liquid into and from said tube.

29. Apparatus of low heat capacity for filtering chilled liquid under pressure comprising a fabric tube the ratio of whose length to diameter is great itself constituting a filter chamber and whose outer surface is in substantially free contact with the surrounding atmosphere and whose inner surface is substantially free of contact with structure of high heat capacity and conductivity, end closures for said tube, means for delivering liquid into and withdrawing liquid from said tube, a heating element within said tube and connections thereto, the heat capacity of said tube and said parts associated therewith being small, whereby the quantity of heat absorbed by chilled liquid introduced after operation of said heating element is small.

30. Apparatus of low heat capacity for filtering wax from chilled oil comprising a substantially vertical fabric tube having its inner and outer surfaces substantially free from contact with other bodies, means for introducing the chilled wax bearing oil under pressure into said tube, a receptacle beneath said tube receiving the filtered oil passing from the interior to the exterior of said tube, means for discontinuing the flow of wax bearing oil into said tube, a heating element within said tube for melting the wax collected upon the inner surface thereof, and means communicating with the lower end of said tube for carrying off the melted wax collected in the bottom thereof.

In testimony whereof I have hereunto affixed my signature this 21 day of February, 1918.

HOWARD M. NICHOLS.